United States Patent
Krebs

(10) Patent No.: US 7,624,748 B2
(45) Date of Patent: Dec. 1, 2009

(54) VALVE

(75) Inventor: Clemens Krebs, Tuebingen (DE)

(73) Assignee: Brueninghaus Hydromatik GmbH, Elchingen (DE)

( * ) Notice: Subject to any disclaimer, the term of this patent is extended or adjusted under 35 U.S.C. 154(b) by 298 days.

(21) Appl. No.: 10/592,991

(22) PCT Filed: Feb. 25, 2005

(86) PCT No.: PCT/EP2005/001999

§ 371 (c)(1),
(2), (4) Date: Sep. 15, 2006

(87) PCT Pub. No.: WO2005/095832

PCT Pub. Date: Oct. 13, 2005

(65) Prior Publication Data

US 2007/0137711 A1 Jun. 21, 2007

(30) Foreign Application Priority Data

Mar. 15, 2004 (DE) .................. 10 2004 012 554
Apr. 26, 2004 (DE) .................. 10 2004 020 275

(51) Int. Cl.
*F16K 17/04* (2006.01)
*F16K 27/02* (2006.01)
(52) U.S. Cl. ............ 137/15.17; 137/15.18; 137/315.11; 137/454.5; 137/514.5; 137/540; 137/315.33
(58) Field of Classification Search ............ 137/454.5, 137/540, 514.5, 543.23, 536, 15.17, 15.18, 137/315.11–315.13, 315.33
See application file for complete search history.

(56) References Cited

U.S. PATENT DOCUMENTS

| | | | | |
|---|---|---|---|---|
| 2,412,205 A | * | 12/1946 | Cook ......................... | 137/540 |
| 2,415,258 A | * | 2/1947 | Parker et al. ................. | 137/536 |
| 3,789,862 A | * | 2/1974 | Keller, III ................ | 137/15.18 |
| 4,493,338 A | * | 1/1985 | Petursson ................ | 137/454.2 |
| 4,966,186 A | * | 10/1990 | Rodstein ................... | 137/454.5 |
| 5,050,633 A | * | 9/1991 | Tarnay et al. ............ | 137/454.5 |

(Continued)

FOREIGN PATENT DOCUMENTS

DE 3600 130 A1 7/1987

(Continued)

OTHER PUBLICATIONS

"Flutec Ruckschlagventile RV5E" [Flutec Nonreturn valves RV5E] (FLUTEC, fluidtechische Gerate GmbH, brochure No. 5.175.2/7.95 HYDAC catalogue 01 section 9).

*Primary Examiner*—Stephen Hepperle
(74) *Attorney, Agent, or Firm*—Scully, Scott, Murphy & Presser, P.C.

(57) ABSTRACT

The invention relates to a valve which is insertable into a receiving recess (21) of a valve carrier (22), the valve (1, 1') comprising a first housing part (2, 2') and a closing body (4). The closing body (4) cooperates with a sealing surface (9) to form a sealing seat, the valve (1, 1') being fixable in the receiving recess (21) of the valve carrier (22) by means of the first housing part (2, 2'). A second housing part (3, 3') is connectable by way of a first end (7) to the first housing part (2, 2') and the sealing surface (9) cooperating with the closing body (4) is formed on the second housing part (3, 3').

20 Claims, 5 Drawing Sheets

U.S. PATENT DOCUMENTS

| | | | |
|---|---|---|---|
| 5,107,890 A * | 4/1992 | Gute | 137/539 |
| 5,511,831 A | 4/1996 | Barton | |
| 6,189,561 B1 * | 2/2001 | Burke et al. | 137/454.5 |
| 6,298,879 B1 * | 10/2001 | Knapp | 137/625.31 |
| 2001/0052361 A1 | 12/2001 | Kushida et al. | |

FOREIGN PATENT DOCUMENTS

| | | |
|---|---|---|
| DE | 40 25 488 C 2 | 2/1991 |
| DE | 100 14 191 A 1 | 9/2001 |

* cited by examiner

VALVE

The invention relates to a valve which is insertable into a receiving recess of a valve carrier.

In the construction of hydraulic devices, e.g. in mobile hydraulics, it is customary to use valves which are screwed into a receiving recess of a valve carrier. Such a valve, designed as a non-return valve, is known from the data sheet "Flutec Rückschlagventile RV5E" [Flutec Nonreturn valves RV5E] (FLUTEC, fluidtechnische Geräte GmbH, brochure No. 5.175.2/7.95 HYDAC catalogue 01 section 9). The valve has a housing which can be screwed into a valve carrier. The valve is screwed in until a collar formed on the housing bears on the valve carrier. Formed in the housing of the valve is a sealing surface which sealingly cooperates with a closing body and hence separates an inlet from an outlet. The closing body is arranged in a recess of the housing and subjected to a spring force. The sealing of the valve with respect to the valve carrier is effected via radially acting sealing elements which are arranged, in the axial direction, on both sides of the radially arranged outlet openings on the housing.

In the case of the valve shown, it is disadvantageous that the housing of the valve consists of only one component. Owing to the fixedly predetermined length of this one component, radially sealing elements are required to prevent the risk of leaks on account of manufacturing tolerances in the axial extent of the receiving recess.

The object on which the invention is based is to provide a valve which is insertable into a receiving recess of a valve carrier, with the overall length of the valve automatically adapting to the particular mounting length of the receiving recess.

The object is achieved by the valve according to the invention, having the features of Claim 1.

The valve according to the invention has a housing composed of a first housing part and a second housing part connectable thereto. For this purpose, the second housing part is connectable, by way of a first end, to the first housing part. The first housing part fixes the valve, in the installed state, in a receiving recess of a valve carrier.

Formed on the second housing part, at its first end, is a sealing surface which cooperates with a closing body to form a sealing seat. By connecting the first to the second housing part via the first end of the second housing part, the overall length of the valve can be adjusted. It is thus possible to compensate for differences in length of the receiving recess, which are unavoidable during manufacture. This enables sealing between the second housing part of the valve and the valve carrier in the axial direction.

The measures listed in the subclaims relate to advantageous developments of the valve according to the invention.

In particular, it is advantageous to produce the connection between the first housing part and the second housing part by a press-fit connection. The exact length can thus be set directly by the insertion into the receiving recess. When fixing the first housing part in the receiving recess, the second housing part is then automatically pressed into or onto the first housing part. For this purpose, the second housing part bears on a corresponding surface of the receiving recess of the valve carrier. Sealing is thus simultaneously achieved between the second housing part and the valve carrier.

Furthermore, it is advantageous that on the first housing part there is formed a bearing surface which, according to a further advantageous configuration, receives an axial sealing element. If the fixing of the first housing part in the valve carrier is effected, for example, by a screw connection, the entire, preassembled valve can be simply inserted into the receiving recess and screwed in until the bearing surface bears on the valve carrier. In the process, the second housing part is simultaneously pressed into or onto the first housing part.

According to a further preferred embodiment, the press-fit connection is designed, by two regions formed axially offset with respect to one another, as a first press fit and a second press fit which each have different radial extents. Such a stepped press fit facilitates the insertion of the second housing part into the first housing part. Particular preference is given here to the formation of a conical transition between the regions of the first and the second press fit and respectively arranged on the first housing part and the second housing part, the transition simplifying the preassembly of the valve. Instead of being inserted into the first housing part, it is, of course, also possible for the second housing part to be pressed onto the first housing part. To shorten the description, only the variant with a second housing part pressed into the first housing part is described below.

The press fits can be designed either so that beyond the maximum available pressing-in depth a constant pressing force is obtained or else so that the pressing force increases as the pressing-in depth increases. For this purpose, one of the regions on the first housing part or the second housing part is conically designed. The plastic deformation of the respective other housing part thereby forced to occur upon insertion of the valve improves the connection between the first housing part and the second housing part and is therefore particularly advantageous from the point of view of the long life of the connection. In addition, the sealing action between the second housing part and the valve carrier can thus be improved.

To check the pressing-in depth, a marking is preferably formed on the second housing part, with the aid of which it is possible to check the relative position of the second housing part with respect to the first housing part in the axial direction. A stop surface may also be formed, as the marking, either on the first or on the second housing part, and simultaneously determines a maximum pressing-in depth. A shortening of the overall length of the valve going beyond this maximum pressing-in depth then takes place via an additional plastic deformation.

The second housing part preferably has an inlet opening axially penetrating through it, so that the second housing part can be produced as a simple, preferably approximately cylindrical, sleeve. While this sleeve is, for example, turned from a high-quality material, in particular because of the sealing with respect to the valve carrier which is to be achieved therewith, the first housing part may also be produced from a plain material.

The valve according to the invention is illustrated in a simplified manner in the drawing and explained in more detail in the following description. In the drawing.

Figure 1:
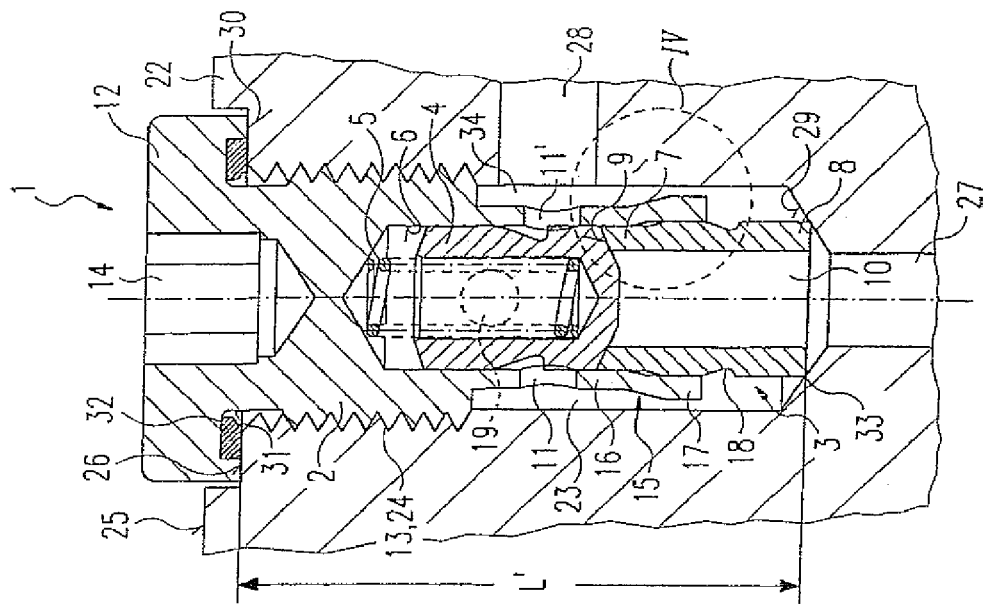
FIG. 1 shows a first exemplary embodiment of a preassembled valve according to the invention.

In FIG. 1 a first exemplary embodiment of a valve 1 according to the invention is shown, with the valve 1 according to the invention preassembled. A valve 1 preassembled in such a way is provided for subsequent insertion into a receiving recess. The valve 1 comprises a valve housing composed of a first housing part 2 and a second housing part 3. The connection between the first housing part 2 and the second housing part 3 enables a resulting overall length L to be determined by enabling the relative axial position of the second housing part 3 with respect to the first housing part 2 to be changed.

Arranged in a central recess 6 in the interior of the housing of the valve 1 is a closing body 4 which is loaded by a compression spring 5. In the exemplary embodiment illustrated, the central recess 6 is arranged in the first housing part 2. The second housing part 3 has a first end 7 which can be inserted a little way into the central recess 6. The fixing of the first end 7 of the second housing part 3 is preferably effected via a press-fit connection between the first and the second housing part 2, 3. A sealing surface 9 is formed on the end face of the first end 7 of the second housing part 3. In the exemplary embodiment illustrated, the valve 1 is designed as a nonreturn valve. The closing body 4 is of pot-shaped configuration and is brought into the closed position by the compression spring 5. In the closed position, the closing body 4 is held in sealing contact with the sealing surface 9 of the second housing part 3.

An inlet opening 10 penetrating in the axial direction through the second housing part 3 is closed, and thus a connection to outlet openings 11, 11' is interrupted, by the bottom of the pot-shaped closing body 4. If a hydraulic fluid, for example, is supplied to the valve 1 through the inlet opening 10, the pressure of this fluid acts on the bottom of the pot-shaped closing body 4. The hydraulic force thus acting on the closing body 4 acts against the force of the compression spring 5, so that when the spring force is exceeded the closing body 4 is displaced further into the central recess 6 and hence lifts off from the sealing surface 9.

The outlet openings 11, 11' are now no longer covered by the closing body and are connected to the inlet opening 10. Consequently, the lines or ducts (not illustrated in FIG. 1) connected to the outlet openings 11, 11' and the inlet opening 10 are also connected to one another. When the pressure in the inlet opening 10 decreases, the force of the compression spring 5 exceeds the oppositely directed hydraulic force, whereby the closing body 4 is again brought, by way of its bottom, into contact with the sealing surface 9 on the end face of the first end 7 of the second housing part 3. In order to prevent damage to the closing body 4 by the repeated lifting off and setting down again on the sealing surface 9, the sealing surface 9 can be enlarged by bevelling the end surface of the first end 7 of the second housing part 3, thereby producing automatic centring of the closing body 4 on setting down.

While the first end 7 of the second housing part 3 is pressed a little way into the central recess 6 of the first housing part 2 for connection to the first housing part 2, the opposite, second end 8 of the second housing part 3 projects out of the first housing part 2. The overall length L of the valve 1 is determined by the length of the two housing parts 2 and 3 and the depth to which the second housing part 3 is pressed into the first housing part 2.

The first housing part 2 has three sections following one another axially. In the exemplary embodiment illustrated in FIG. 1, a screw head 12 is provided first of all, followed by a threaded section 13. By means of the external thread formed in this region, the preassembled valve 1 is fixed in the receiving recess provided to receive it. To screw the valve 1 into the receiving recess, a hexagon socket 14 is made in the screw head 12 in the exemplary embodiment illustrated. Any other customary fastening is also conceivable instead of the screw head 12 with the hexagon socket 14. By way of example, mention may be made here of the use of a screw head 12 with a hexagon. It is equally conceivable simply to insert the valve 1 into the receiving recess and fix it therein using a clamp clip, for example. Following the threaded section 13, in the direction of the second housing part 3, is a sleeve-shaped section 15. Arranged in this sleeve-shaped section 15, in the direction towards the open end of the central recess 6 of the first housing part 2, are first of all the outlet openings 11, 11'. The outlet openings 11, 11' penetrate through the sleeve-shaped section 15 in the radial direction. Arranged further towards the open end are a first region 16 and a second region 17. The first region 16 and the second region 17 cooperate with corresponding regions of the second housing part 3 to produce a press-fit connection. The press-fit connection, as well as the geometries formed for this purpose on the first housing part 2 and the second housing part 3, will be explained below with reference to FIGS. 4 and 5.

A marking 18 is provided, at the outer periphery, on the second housing part 3 and is used to check the depth to which the second housing part 3 is pressed into the first housing part 2. In the exemplary embodiment illustrated in FIG. 1, this marking 18 is formed as an encircling groove on the second housing part 3. Instead of an encircling groove, which is preferably made during turning of the second housing part 3, an operation which is required anyway, it is, however, also possible for another form of the marking to be, for example, incised or made with a laser.

To improve the opening behaviour, a further radial opening 19 is formed in the first housing part 2, this opening being made in the sleeve-shaped section 15 offset, relative to the outlet openings 11, 11', in the axial direction towards the screw head 12. As a result of this further radial opening 19, pressure equalisation takes place between the space in which the closing body 4 is arranged and the region surrounding the sleeve-shaped section 15 as early as during the opening of the valve 1. The closing body 4 is arranged with a running clearance in the central recess 6. The gap thus formed between the closing body 4 and the wall of the central recess 6 allows pressure medium displaced from the central recess 6 to flow through upon opening. In the process, the pressure medium can escape from the further radial opening 19 into the volume surrounding the sleeve-shaped section 15.

To improve the opening behaviour even further, an encircling groove 20 is additionally made in the cylindrical region of the pot-shaped closing body 4. As will be explained below in the explanation of FIG. 3, the fluid displaced upon opening is led away through this encircling groove 20.

Figure 2:
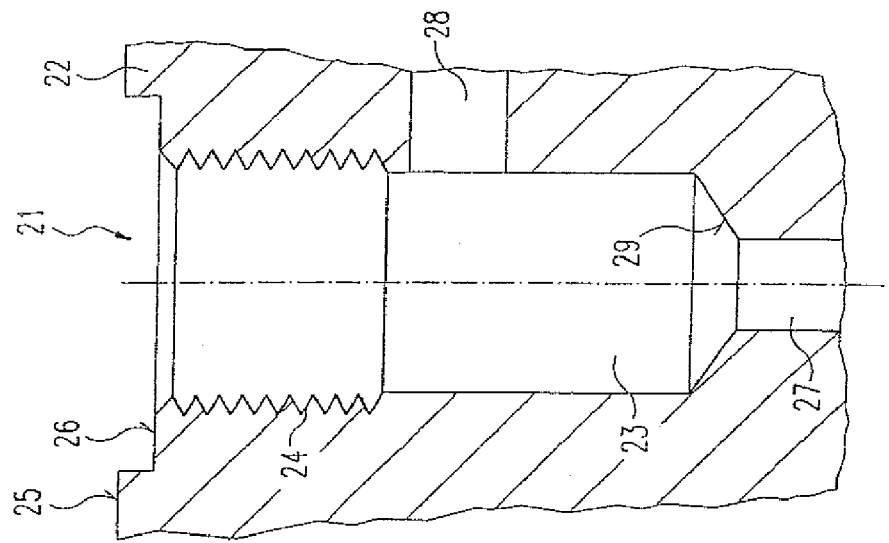
FIG. 2 shows a schematic illustration of a receiving recess provided for receiving the valve according to the invention.

In FIG. 2 a section through a valve carrier 22 is shown to illustrate a receiving recess 21. The receiving recess 21 is provided for receiving the valve 1 illustrated in FIG. 1. The receiving recess 21 consists essentially of a blind hole 23. A thread 24 is made in the blind hole 23, in the region directed towards an upper surface 25 of the valve carrier 22. The preassembled valve 1 of FIG. 1 is inserted into the receiving recess 21 and the threaded section 13 of the first housing part 2 is screwed to the thread 24 of the blind hole 23. A shoulder 26 is formed on the upper surface 25 of the valve carrier 22, so as to form, around the receiving recess 21, a plane surface suitable as a bearing surface for an axial seal. The radial extent of the shoulder 26 is dimensioned so that the screw head 12 of the valve 1 can be sunk therein. The screw head 12 is partially or completely sunk in the shoulder 26 here depending on the depth of the shoulder 26.

An inlet duct 27 opens into the blind hole 23, the pressure medium being supplied to the valve 1 through this duct if the valve 1 is designed as a nonreturn valve. In the exemplary embodiment illustrated, a preferred arrangement of the inlet duct 27 in which the centre axis of the inlet duct 27 coincides with the centre axis of the blind hole 23 is illustrated. Furthermore, at least one outlet duct 28, which opens laterally into the blind hole 23, is formed in the valve carrier 22. In the exemplary embodiment illustrated, the centre axis of the outlet duct 28 and the centre axis of the blind hole 23 are perpendicular to one another.

Formed between the wall of the valve carrier 22 radially surrounding the blind hole 23 and the inlet duct 27 connected to the bottom of the blind hole 23 is a transition 29. The transition 29 has a shape which tapers radially in the direction of the inlet duct 27, this shape preferably being conical and being produced when drilling the blind hole 23. The surface finish of the transition 29 must be chosen to be of sufficiently high quality for a sealing action to be achieved through contact of the second end 8 of the second housing part 3. For this purpose, the material from which the second housing part 3 is produced is preferably of higher quality than the material of the valve carrier 22. Just like the valve carrier 22, the material of the first housing part 2 can also be of more modest quality.

Figure 3:
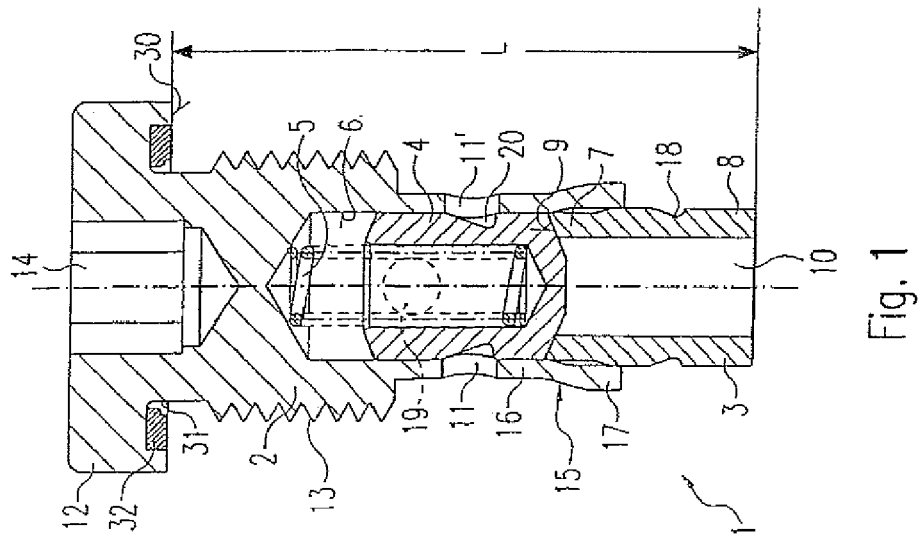
FIG. 3 shows a valve according to the invention, according to the first exemplary embodiment, in the installed state.

In FIG. 3 the valve 1 is illustrated in the installed state. As has already been explained in the statements relating to FIG. 2, the preassembled valve 1 is inserted into the receiving recess 21 and fixed therein by way of the threaded section 13 by screwing into the thread 24. The overall length L of the preassembled valve 1 is longer than the depth of the blind hole 23 between the shoulder 26 and the transition 29 at the place at which the second end 8 of the second housing part 3 rests thereon. The second end 8 of the second housing part 3 thus rests on the transition 29 even before a bearing surface 30 bears on the shoulder 26. The bearing surface 30, which is oriented in the direction of the open end of the first housing part 2, has a further encircling groove 31, in which a sealing means, preferably an O-ring 32, is placed. This O-ring 32 cooperates sealingly with the shoulder 26 when the bearing surface 30 is in contact with the shoulder 26.

In order to bring the O-ring 32 into contact with the shoulder 26, the second housing part 3 must first of all be pressed into the first housing part 2, in order thereby to shorten the overall length L of the preassembled valve 1 to a mounting length L'. The pressing force required is produced directly upon screwing in by the second end 8 of the second housing part 3 being supported on the transition 29. A sealing edge 33 is formed, at the outer periphery, on the second end 8 of the second housing part 3.

By pressing the second housing part 3 into the first housing part 2, not only is the original overall length L shortened to the mounting length L', but simultaneously a considerable surface pressure is produced between the sealing edge 33 and the transition 29. On account of the larger diameter of the blind hole 23 compared with the outside diameter of the sleeve-shaped section 15 of the first housing part 2, a volume 34 is formed around the sleeve-shaped section 15 of the first housing part 2 and the part of the second housing part 3 projecting out of this sleeve-shaped section 15. A connection between the volume 34 and the inlet duct 27 is possible, after the mounting of the valve 1, during which a sealing action is produced between the sealing edge 33 and the transition 29, only when the valve 1 is open. The sealing action is achieved in a simple manner by screwing the preassembled valve 1 into the receiving recess 21 until the bearing surface 30 bears on the shoulder 26 of the valve carrier 22, the valve 1 being simultaneously shortened to the mounting length L'.

The automatic adjustment of the mounting length L' allows relatively large tolerances in respect of the overall length of the individual components of the valve 1 to be compensated. The mounting length L' is determined by the distance between the shoulder 26 of the valve carrier 22 and the point of impact of the second end 8 of the second housing part 3 upon insertion of the valve 1 into the receiving recess 21. This mounting length L' must be smaller than the overall length L of the preassembled valve 1. The minimum mounting length L' is the overall length L minus the maximum depth to which the second housing part 3 is pressed into the first housing part 2. Consequently, considerable manufacturing tolerances are permissible without the sealing action both in respect of the second housing part 3 at the transition 29 and of the O-ring 32 for sealing the first housing part 2 at the shoulder 26 being impaired.

Instead of the arrangement, shown in the exemplary embodiment illustrated, of an O-ring 32 in a further encircling groove 31 at the screw head 12, the formation of such a groove 31 may also be dispensed with and, for example, a flat sealing washer may be placed between the bearing surface 30 and the shoulder 26.

By pressing the second housing part 3 into the first housing part 2, the compression spring 5 is prestressed in that the closing body 4, which in the unpressurised state bears on the sealing surface 9 of the second housing part 3, is pushed back further into the central recess 6. The encircling groove 20 formed on the closing body 4 at the periphery thereof thereby comes into a position of overlapping the further opening 19, whereby the opening behaviour of the valve 1 can be positively influenced.

To damp the valve 1 upon opening, the pressure medium enclosed in the central recess 6 can escape via a gap formed between the closing body 4 and the central recess 6. Upon opening, the closing body 4 moves in the direction of the closed end of the central recess 6 and thus reduces a rear volume 6' formed therein, behind the closing body 4, in the central recess 6.

In the process, the pressure medium is displaced along the gap between the closing body 4 and the central recess 6 in accordance with the reduction of the rear volume 6'. The pressure medium passes as far as into the encircling groove 20 and flows off into the volume 34 via the further radial opening 19. The gap between the closing body 4 and the central recess 6 is dimensioned here so as to obtain a desired damping of the valve 1 which decreases with increasing running clearance of the closing body 4.

Consequently, the opening behaviour is essentially determined by the compression spring 5 which is used and the pressure acting on the end surface of the pot-shaped closing body 4 and supplied via the inlet duct 27.

Owing to the valve 1 being sealed with an axial seal in the region of the screw head 12 and owing to the sealing action between the sealing edge 33 formed on the second end 8 of the second housing part 3 and the transition 29, the otherwise customary radial sealing elements can be dispensed with. Besides reducing the requirement for component precision, a reduction of the radial dimensions of the valve 1 is also obtained. In addition, it is also possible to use in each case the same first housing part 2 for different mounting lengths L' envisaged. Adaptation to different mounting lengths L' is effected simply by an appropriate length of the second housing part 3, which is inexpensive to produce on account of its simple geometry.

Figure 4:
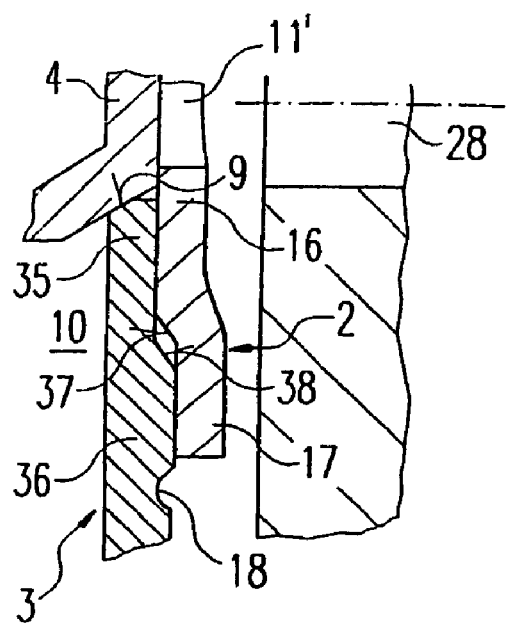
FIG. 4 shows a first example of a connection between the first and the second housing part.

In FIG. 4 a first example of a press-fit connection between the first housing part 2 and the second housing part 3 is shown in the detail IV of FIG. 3. As has already been explained in the description of FIG. 1, a first region 16 is formed on the sleeve-shaped section 15 of the first housing part 2, adjacent to the outlet openings 11, 11'. This first region 16 has an inside diameter which cooperates jointly with a corresponding outside diameter of a first region 35 formed at the first end 7 of the second housing part 3 to produce a first press fit.

Formed at the open end of the first housing part 2 is the second region 17, the inside diameter of the second region 17 of the first housing part 2 being greater than the inside diameter of the first region 16 of the first housing part 2. The second region 17 of the first housing part 2 cooperates with a second region 36 of the second housing part 3 to produce a second press fit. For this purpose, the outside diameter of the second housing part 3 in the second region 36 of the second housing part 3 is, accordingly, greater than the outside diameter in the first region 35 of the second housing part 3. Preassembly is facilitated by the two different diameters of the first press fit and of the second press fit in the first regions 16, 35 of the first and second housing part 2, 3, respectively, and the second regions 17, 36 of the first and second housing part 2, 3, respectively. For this purpose, the transition between the first region 16, 35 and the second region 17, 36 is designed as a first conical transition 37 and as a second conical transition 38, respectively. The conical transitions 37 and 38 prevent tilting upon insertion of the second housing part 3 into the first housing part 2.

The axial extent of the first region 35 of the second housing part 3 and the axial extent of the second region 17 of the first housing part 2 are preferably equal, so that upon insertion for preassembly of the valve 1 the second housing part 3 is automatically centred by the first and the second conical region 37, 38.

Figure 5:
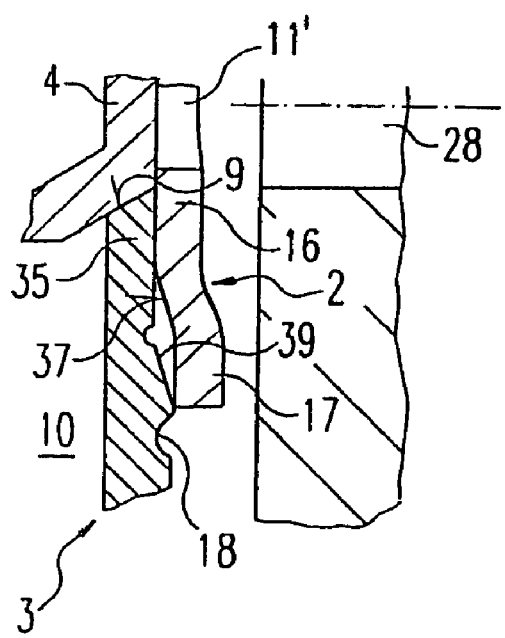
FIG. 5 shows a second example of a connection between the first and the second housing part.

A further example of a press-fit connection is illustrated in FIG. 5. In contrast to the exemplary embodiment of FIG. 4, only a first region 35 is formed on the second housing part 3, this region forming a first press fit with the corresponding first region 16 of the first housing part 2. Instead of the second region 36 of the second housing part 3, however, a conical section 39 is formed on the second housing part 3. This conical section 39 cooperates with the second region 17 of the first housing part 2 only when a certain pressing-in depth is reached. If the second housing part 3 is pressed deeper into the first housing part 2, a deformation of the first housing part 2 takes place by a widening of the second region 17 of the first housing part 2 at its open end.

Figure 6:
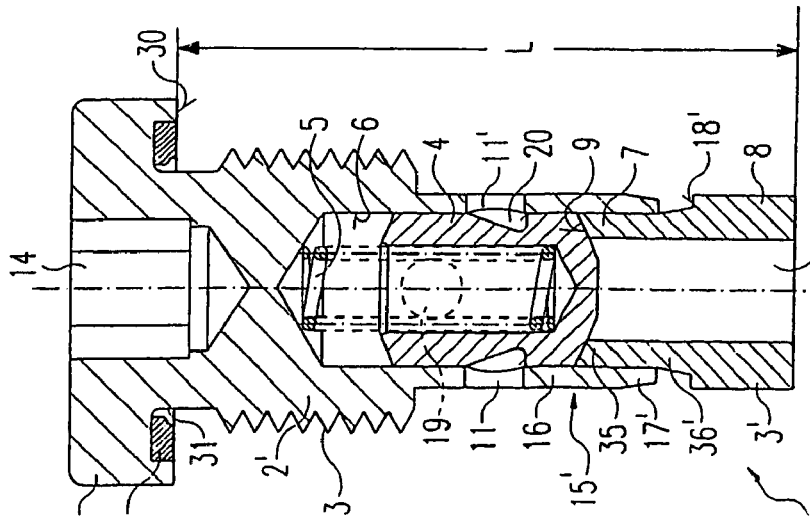
FIG. 6 shows a second exemplary embodiment of a preassembled valve according to the invention.

FIG. 6 shows a second exemplary embodiment of a preassembled valve 1' according to the invention. Those elements of FIG. 6 which correspond to elements of the first exemplary embodiment of FIG. 1 are denoted by identical reference symbols. Description thereof again is dispensed with in order to avoid unnecessary repetition.

The difference of the second exemplary embodiment of FIG. 6 from the first exemplary embodiment illustrated in FIG. 1 and described in detail lies in the connection between the first housing part 2' and the second housing part 3'. To connect the second housing part 3' to the first housing part 2', in the second exemplary embodiment too, a first region 16 is formed on the first housing part 2' on the sleeve-shaped section 15', this region cooperating with a corresponding first region 35 of the second housing part 3' to produce a press fit. Following the first region 16 of the first housing part 2' in the direction of the open end of the first housing part 2' is a second region 17', the inside diameter of which is unchanged with respect to the inside diameter of the first region 16 of the first housing part 2'. The outer periphery in the second region 17' of the first housing part 2' tapers in the direction of the open end of the first housing part 2'.

Starting from the first region 35 of the second housing part 3', a second region 36' which widens radially follows in the direction of the second end 8 of the second housing part 3'. This preferably conical widening of the second region 36' of the second housing part 3' extends in the axial direction as far as the marking 18'. The marking 18' is formed as a radial step in the exemplary embodiment illustrated. This radial step not only visually indicates the maximum pressing-in depth, but at the same time forms a stop surface for the open end of the first housing part 2', so that the maximum pressing-in depth is limited by the marking 18'.

The radial step is preferably formed so that the outside diameter of the cylindrical second housing part 3' in the region of the second end 8 corresponds to the outside diameter of the sleeve-shaped section 15' of the first housing part 2' in the first region 16. For preassembly, the second housing part 3' is introduced by way of its first region 35 into the open end until the conical widening in the second region 36' of the second housing part 3' is in contact with the open end of the first housing part 2'.

The arrangement of the conical region may, of course, also be provided in the other regions of the first or second housing part 2', 3'. What is crucial here is merely that, upon pressing in, the corresponding region of the respective other housing part undergoes plastic deformation.

Figure 7:
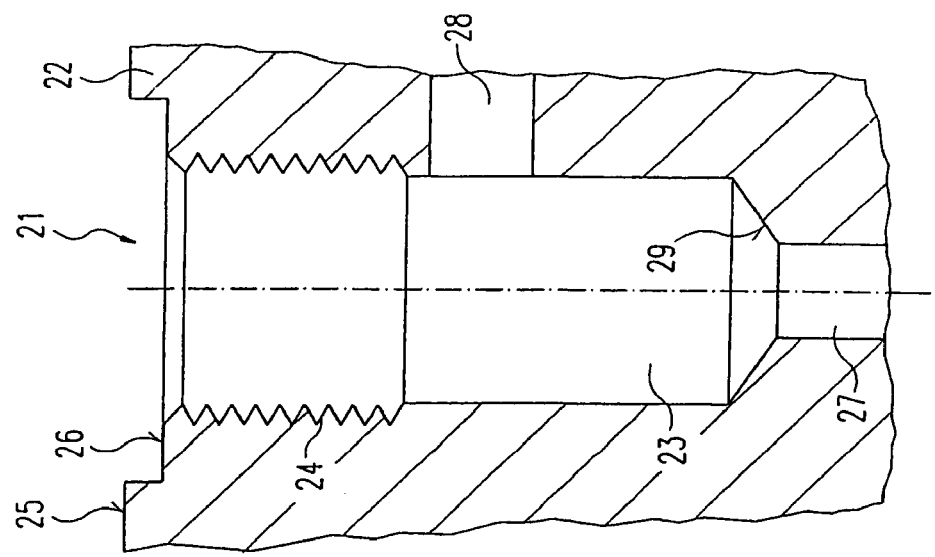
FIG. 7 shows a schematic illustration of a receiving recess provided for receiving the valve according to the invention.

To receive the valve 1' thus preassembled, provision is again made for a receiving recess 21 which is illustrated once again in FIG. 7 and corresponds in its design to the receiving recess 21 already described in FIG. 2.

In contrast to the first exemplary embodiment, upon insertion of the preassembled valve 1' into the receiving recess 21, the second region 17' of the first housing part 2' is now plastically deformed when the second housing part 3' is pressed into the central recess 6 of the first housing part 2'. The conical taper of the first housing part 2' in the second region 17' preferably corresponds to the conical widening of the second region 36' of the second housing part 3'. Consequently, when the second housing part 3' is pressed into the first housing part 2' a cylindrical outer contour, consisting of the sleeve-shaped section 15' of the first housing part 2' and the cylindrical second end 8 of the second housing part 3', results as far as the marking 18'.

Figure 8:
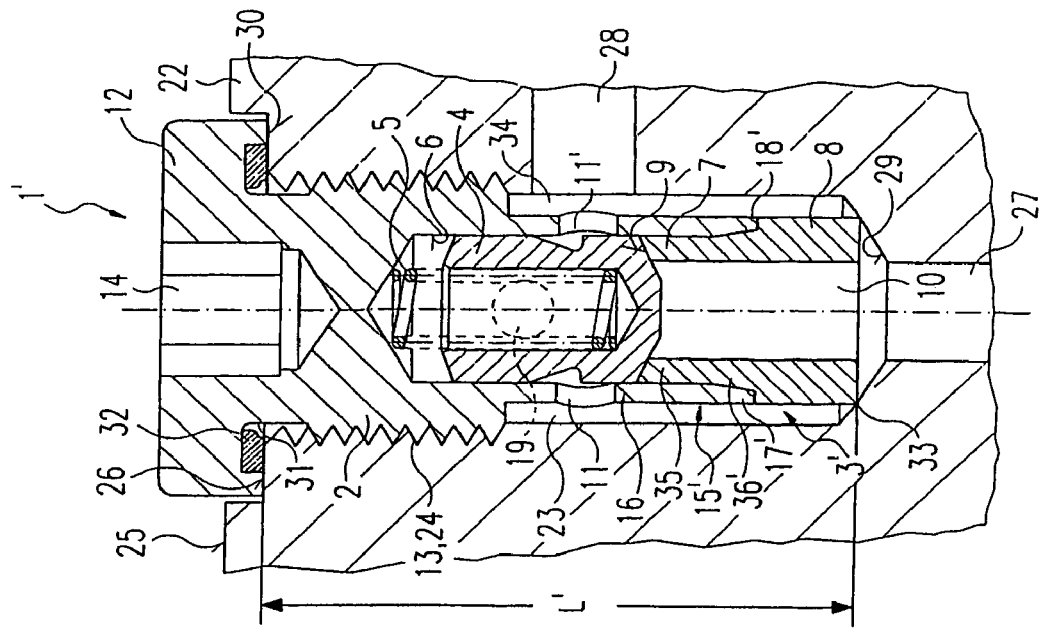
FIG. 8 shows a valve according to the invention, according to the second exemplary embodiment, in the installed state.

If the first housing part 2' is situated with its open end already in contact with the marking 18' formed as a radial step before the bearing surface 30 of the screw head 12 bears on the shoulder 26, further screwing of the preassembled valve 1' into the receiving recess 21, on the one hand, increases the surface pressure at the sealing edge 33 and, on the other hand, produces plastic deformation of the sleeve-shaped section 15' in its weakest region. As illustrated in FIG. 8, the webs formed between the outlet openings 11, 11' are deformed outwards during this.

The deliberate plastic deformation of the sleeve-shaped section 15' outwards prevents jamming of the closing body 4 upon compression of the sleeve-shaped section 15'. The sleeve-shaped section 15', the central recess 6 of which is cylindrically formed, has at its outer side, in the region of the webs between the bores 11, 11', an outwardly oriented pre-curvature even before the compression. The neutral axis of the webs is thus outwardly pre-curved even in the unloaded state, with the result that the plastic deformation likewise takes place in this direction in the event of loading. This results in the geometry illustrated in FIG. 8.

Compared with the first exemplary embodiment, the second exemplary embodiment has the advantage that a considerable axial force of the sealing edge 33 is exerted on the transition 29, irrespective of the quality of the first press fit between the first regions 16 and 35 of the first housing part 2' and of the second housing part 3'. It is thus possible to further reduce the required precision when manufacturing the components. The required force in the axial direction in order to produce the surface pressure at the sealing edge 33 on the transition 29 is produced even with only a relatively small pressing force by the open end of the first housing part 2' bearing on the radial step of the marking 18'.

Figure 9:
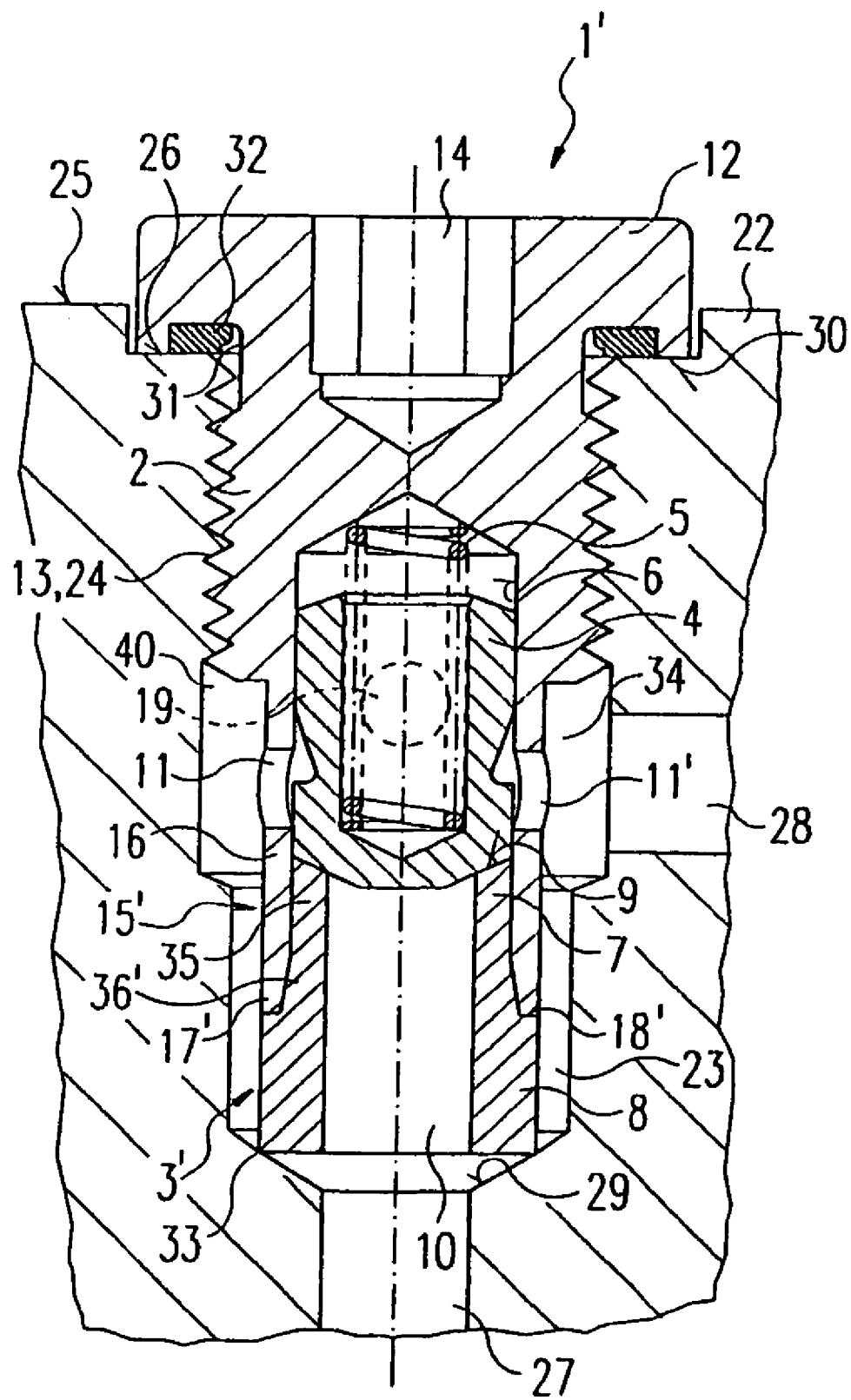
FIG. 9 shows a valve according to the invention, according to the second exemplary embodiment, inserted into a modified receiving recess.

In FIG. 9 the valve 1' is inserted into a modified receiving recess. Here, the thread 24 is followed by an undercut 40, which increases the volume 34. The greater distance between the outlet openings 11, 11' and the wall of the valve carrier 22 delimiting the volume 34 in the region of the undercut 40 is particularly advantageous here. This increased distance leads to a reduction of the throughflow resistance. A particularly simple way of making the undercut 40 in the receiving recess 21' is to mill the thread 24 in the valve carrier 22 such that, following the making of the thread 24, the undercut 40 is produced in one operation.

Figure 10:
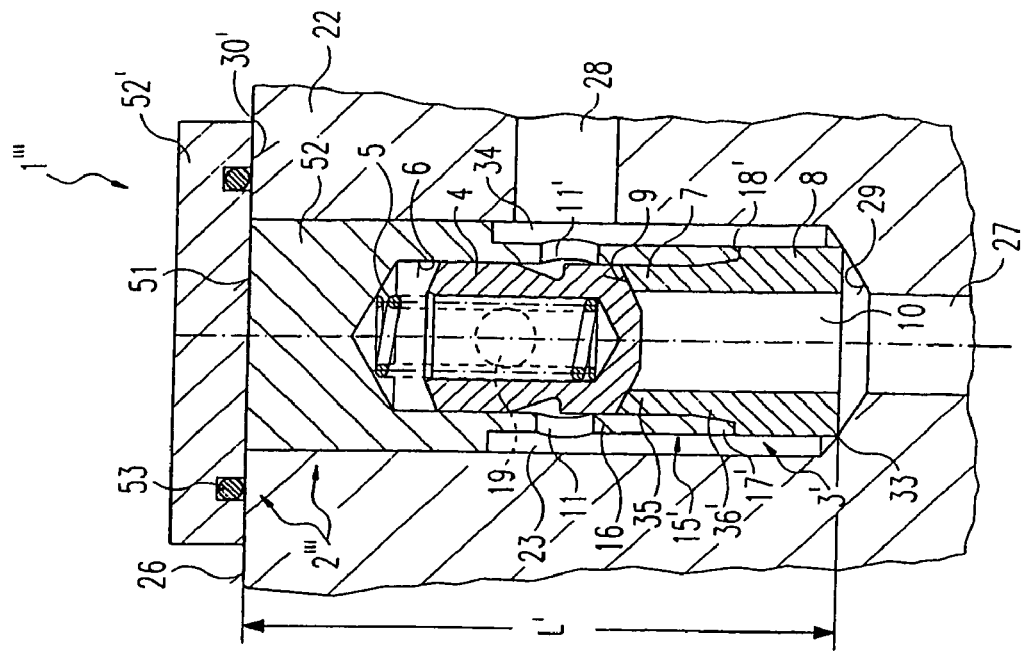
FIG. 10 shows a third exemplary embodiment of a valve according to the invention, in the installed state.

FIG. 10 shows a third exemplary embodiment of the valve 1" according to the invention. Here, in contrast to the first two exemplary embodiments, the first housing part 2" consists of a shortened first part 50, completely arranged within the blind hole 23, and of a screwed sealing plug 50'. The fixing of the shortened first part 2" is effected using the screwed sealing plug 50', which bears on an end surface 51 of the shortened first part 2".

The remaining elements correspond to those of the first exemplary embodiment and are provided with the same reference symbols.

The fourth exemplary embodiment of a valve 1''' is based on the second exemplary embodiment. The first housing part 2''' is again designed in two parts and has an end surface 51 on its shortened first part 52. A sealing plate 52' forming the second part of the first housing part 2" presses, by way of a bearing surface 30', on this end surface 51, the plate being fixed to the upper surface 26' of the valve carrier 22.

Figure 11:
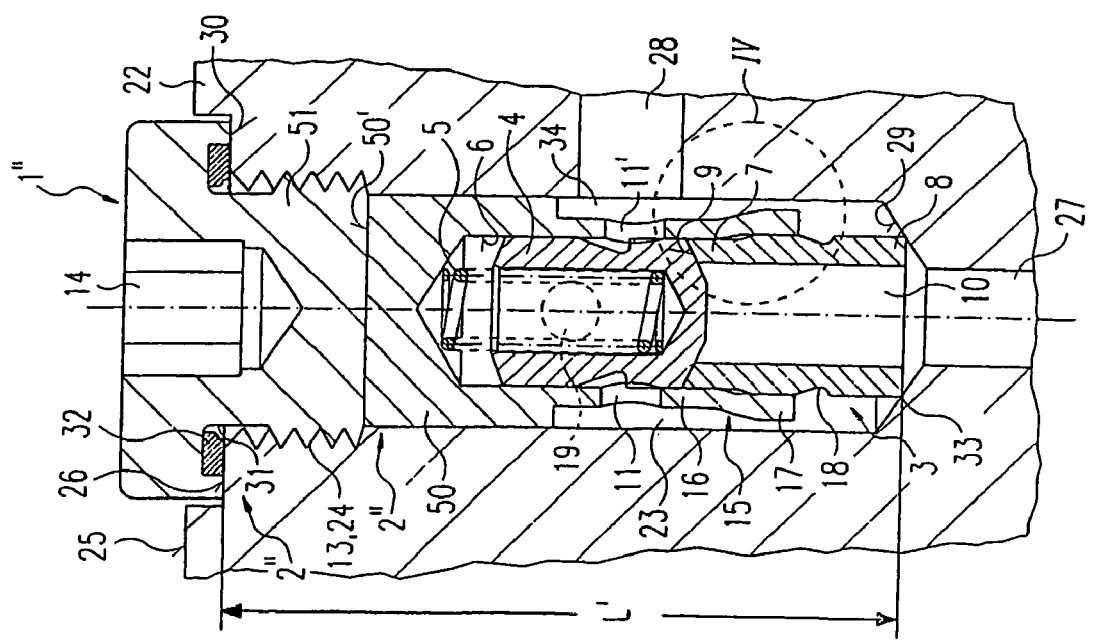
FIG. 11 shows a fourth exemplary embodiment of a valve according to the invention, in the installed state.

The fixing of the sealing plate 52' is not illustrated in FIG. 11 and may be effected, for example, by screwing, riveting or a clamp clip. The length of the first part 52 is preferably dimensioned so that the sealing plate 52' may be formed as a plane plate. In the mounted state, the end surface 51 then terminates flush with the upper surface 26 of the valve carrier 22.

For sealing, provision is made in the sealing plate 52' for a groove in which an O-ring 53 is arranged, the latter sealingly cooperating with the upper surface 26 of the valve carrier 22.

The elements corresponding to the components of the second exemplary embodiment are provided with identical reference symbols and repeated description is dispensed with.

The invention is not restricted to the exemplary embodiments illustrated, but also embraces the combination of the features of different embodiments.

The invention claimed is:

1. A method of manufacturing a valve which is insertable into a receiving recess of a valve carrier, wherein the valve includes a first housing part and a closing body which cooperates with a sealing surface to form a sealing seat, said method comprising:

fixing the valve in the receiving recess of the valve carrier by the first housing part;

connecting a second housing part by way of a first end to the first housing part, and the sealing surface cooperating with the closing body is formed on the second housing part;

connecting the first housing part to the second housing part via a press-fit connection, the first housing part having a bearing surface which, with the valve inserted, determines the axial position of the latter with respect to the valve carrier; and determining an overall length (L) of the valve between a second end of the second housing part and the bearing surface of the first housing part by a depth to which the first end of the second housing part is pressed into the first housing part, whereby the depth of said pressing-in between said housing parts is increased by supporting the second housing part in the receiving recess upon insertion of the valve.

2. A method according to claim 1, wherein a sealing element sealing in the axial direction is provided in the region of the bearing surface.

3. A method according to claim 1, wherein a sealing edge is formed at the second end of the second housing part.

4. A method according to claim 1, wherein a first region is formed on the first housing part, said first region forming a first press fit with a first region of the second housing part.

5. A method according to claim 4, wherein a second region is formed on the first housing part, said second region forming a second press fit with a second region of the second housing part, which has a different radial extent in relation to the first press fit.

6. A method according to claim 5, wherein a first conical transition is formed between the first region and the second region of the first housing part, and a second conical transition is formed between the first region and the second region of the second housing part.

7. A method according to claim 5, wherein, to increase the pressing force with increasing pressing-in depth, at least one of the regions of the first housing part and/or of the second housing part is conically shaped.

8. A method according to claim 5, wherein the axial extent of the first region of the second housing part and the axial extent of the second region of the first housing part are equal.

9. A method according to claim 1, wherein in order to check the pressing-in depth, a marking is arranged on the first housing part or on the second housing part.

10. A method according to claim 1, wherein in order to limit the pressing-in depth, a stop surface is formed on the first or the second housing part.

11. A method according to claim 10, wherein a region which is plastically deformable when the second housing part is pressed deeper into a first housing part is formed on the first housing part.

12. A method according to claim 11, wherein the plastically deformable region has a radially outwardly directed pre-curvature formed on the first housing part.

13. A method according to claim 1, wherein the second housing part has an inlet opening axially penetrating through the second housing part.

14. A method according to claim 1, wherein the first housing part has a central recess formed therein for receiving the closing body and the first end of the second housing part.

15. A method according to claim 14, wherein there is formed at least one radial outlet opening in the first housing part in the region of the central recess.

16. A method according to claim 15, wherein in the region of the central recess there is formed at least one further radial opening that is axially offset with respect to the at least one outlet opening in the direction of the closed end of the central recess.

17. A method according to claim 16, wherein the closing body is formed as a collection receptacle and, at an outer periphery thereof, includes an encircling groove of which the axial position and extent are selected so that the groove at least partly overlaps the at least one further radial opening, when the closing body with the valve mounted, sealingly cooperates with the sealing surface.

18. A method according to claim 13, wherein the closing body in cooperation with the central recess of the first housing part forms a clearance fit for adjusting the damping of the valve, and the pressure medium displaced from a rear volume upon movement of the closing body is leadable away through a gap forming the clearance fit between the closing body and the central recess.

19. A method according to claim 1, wherein the sealing surface is formed on the end face of the first end of the second housing part.

20. A method according to claim 1, wherein the first housing part is fixable in a valve carrier by means of a screw connection.

* * * * *